United States Patent Office 3,015,616
Patented Jan. 2, 1962

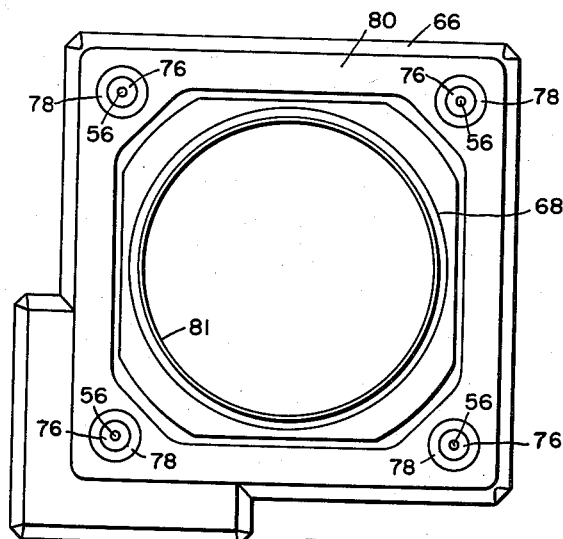
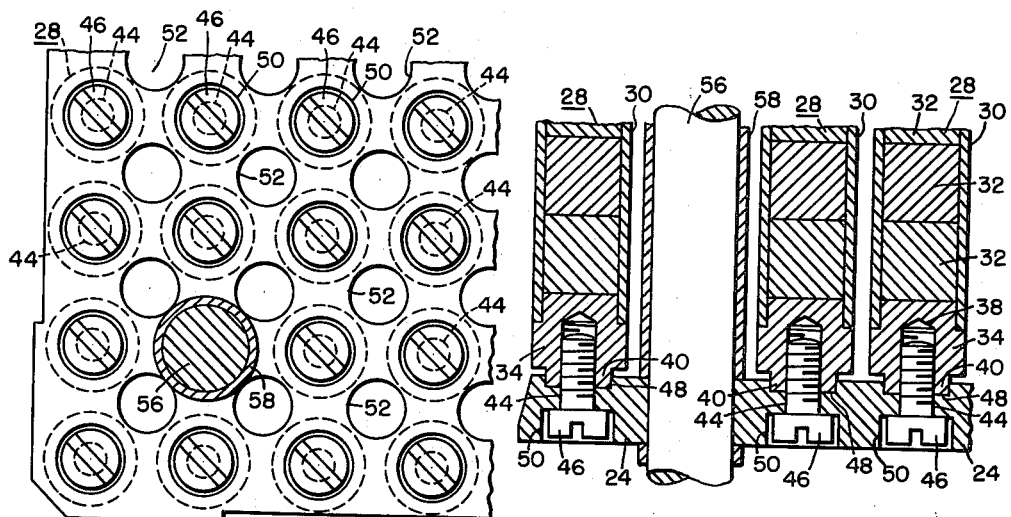
Fig. 2.
Fig. 3.
Fig. 4.

3,015,616
ROD TYPE FUEL ASSEMBLY
William E. Sturtz, Youngwood, and Erling Frisch, Pittsburgh, Pa., assignors to Westinghouse Electric Corporation, East Pittsburgh, Pa., a corporation of Pennsylvania
Filed Nov. 2, 1956, Ser. No. 620,071
16 Claims. (Cl. 204—193.2)

The present invention relates to rod type fuel elements adapted for use with a nuclear power reactor, and more particularly to means for assembling such elements into a bundle thereof.

Heretofore, it usually has been the practice, in assembling rod type fuel elements, to furnish the radioactive fuel in the form of pellets of uranium oxide protectively enclosed within an elongated tubular casing. In the case of highly pressurized water reactors the tubular casing frequently is composed of zirconium or one of its alloys, for such metal has been found to withstand the corrosive effects of water at extreme temperatures and yet to possess the characteristic of low affinity for thermal neutrons. A number of evenly-spaced fuel elements are then suspended between two spacedly parallel end plates to form a fuel bundle. In accordance with prior practices, the ends of the fuel elements have been attached to the end plates by means of fusion welding and then subsequently a number of flow holes have been drilled in the end plates between the welds thereof to accommodate passage of cooling and moderating water through the end plates and around the fuel elements. In the event that zirconium or an alloy thereof is utilized for the tubular casings and the end plates, the welding must be done in an inert atmosphere and therefore performed within an appropriate enclosure or "weld box." Moreover, such welding, besides being cumbersome to effectuate, has required an extremely high degree of skill in order to obtain satisfactory welds, to space properly the fuel elements, and to prevent warping of the end plates. Consequently, it has been extremely difficult and time-consuming to accurately arrange the fuel rods and the necessary coolant flow holes therebetween which have been drilled in the end plates.

Subsequent to welding the fuel elements and drilling the flow holes, the end plates hitherto have required machining after the aforesaid welding in order to conform to the stringent specifications dictated by nuclear power applications. In accordance with necessary safety precautions, if a misweld is made in securing one of the fuel elements to an end plate, the entire fuel element bundle has had to be scrapped in order to prevent radioactive contamination of the cooling and moderating fluid should the defective fuel element bundle be inserted into a reactor core. Therefore, the fabrication of the fuel element bundles of the character described has not only been exceedingly difficult and time-consuming, but the cost thereof has been rendered excessive due to the high proportion of faulty and rejected assemblies.

Accordingly, it is an object of the invention to facilitate the assembly of fuel element bundles of the character described.

Another object of the invention is to ensure accurate placement of the reactor fuel elements when secured to their end plates.

Still another object of the invention is to permit expansion and contraction of fuel elements within the bundle without the warping or bending thereof.

A further object of the invention is to eliminate welding of the bundle while at the same time ensuring that parts thereof do not become loosened and lost into the cooling medium of the reactor during utilization of the fuel bundle within the reactor core.

Yet another object of the invention is to furnish improved means for securing fuel elements to the end plates of a bundle thereof.

A still further object of the invention is to eliminate the necessity for machining the end plates of the fuel element bundle after the assembly thereof.

Another object of the invention is to provide a fuel element bundle which can be readily disassembled without damage to the component parts thereof.

The foregoing and other objects, features and advantages of the invention will be made apparent during the ensuing description of illustrative forms thereof, said description being taken in conjunction with the accompanying drawings wherein:

FIG. 2 is an end view of FIG. 1.

FIG. 3 is a partial sectional view of FIG. 1 taken along reference lines III—III thereof.

FIG. 4 is an enlarged partial sectional view of a connecting means of FIG. 1.

Figure 1:
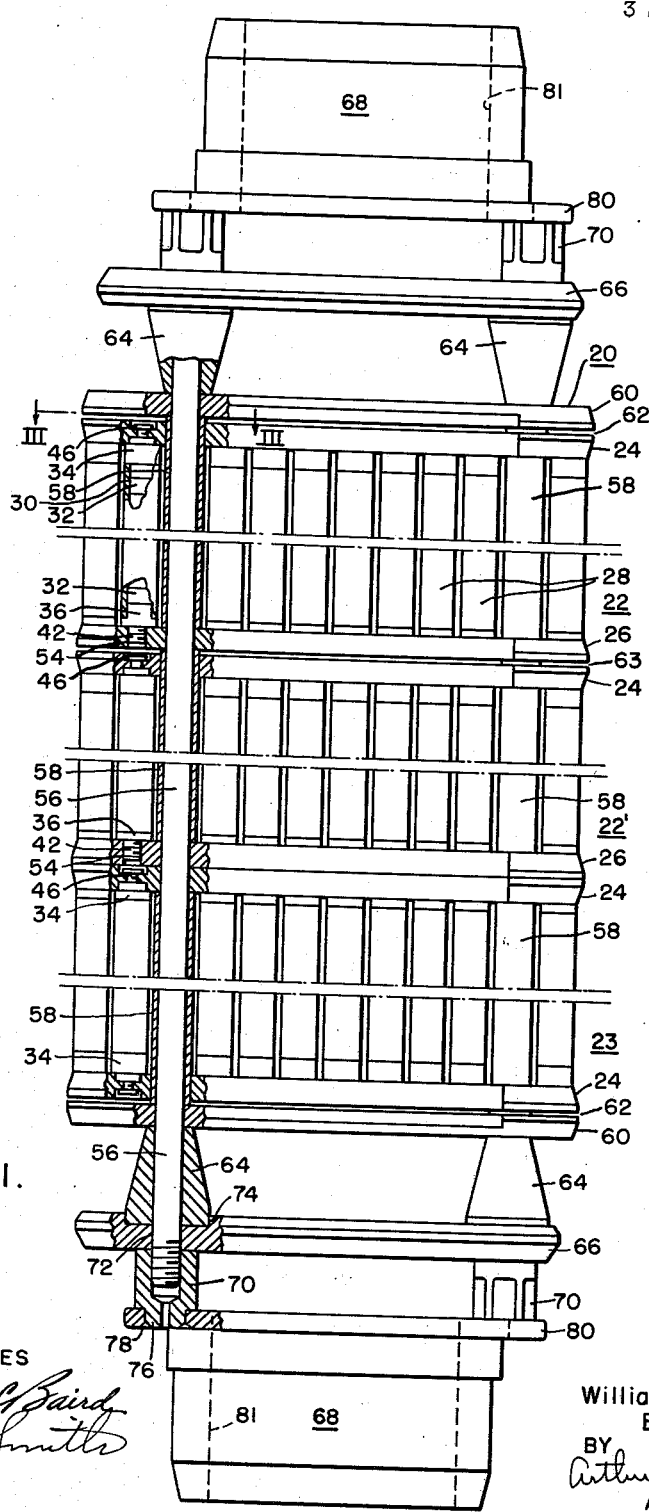
FIGURE 1 is a side view, partly in section, of one form of reactor fuel element bundle constructed in accordance with the principles of the invention.
Figure 5:
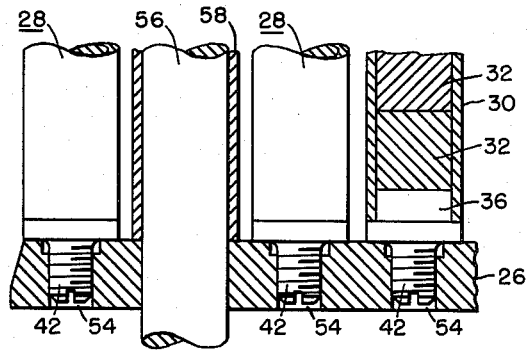
FIG. 5 is an enlarged partial sectional view of another connecting means of FIG. 1.

According to the invention there is provided a reactor fuel element bundle wherein the fuel elements can be quickly and detachably connected to the end plates thereof. Furthermore, means are provided for securing the end plates and fuel elements within the bundle in a manner permitting relative movement thereof necessitated by the expansion of the fuel elements during operation of the reactor. Additionally, the arrangement either prevents loosening of the detachable securing means or provides positive retention thereof in the event that the securing means become loosened. The fuel element bundle is arranged such that assembly thereof can be completed without welding and with the exercise of only minimum skill. Due to the ease of assembly of the fuel bundle of the invention, the fuel elements can be furnished in shortened tandem sections to facilitate handling during assembly thereof.

Referring now more particularly to FIGS. 1 to 5 of the drawings, the exemplary embodiment of the invention depicted therein comprises a fuel element bundle 20 formed from a plurality of subassemblies 22 or 23, three being shown in the drawing for purposes of illustration only. Each of the subassemblies 22 comprises end plates 24 and 26 and a number of rod-type fuel elements 28. As better shown in FIGS. 4 and 5, the fuel elements 28 each includes a tubular casing 30 filled with a number of uranium oxide pellets 32. The pellets 32 are held in place within the tubular member 30 through the use of plug members 34 or 36 preferably seal-welded into respective ends of the tubular member 30. The plug members 34 are each provided with a centrally tapped hole 38 and with an annular projection 40, for purposes presently to be described. Similarly, the plug members 36 are each provided with a central threaded stud 42.

The subassembly 23 is similar to the subassembly 22 with the exception that identical plug members 34 are utilized to seal the respective ends of the fuel casings 30. With this arrangement, the end plate 24 is utilized at either end of subassembly 23; and each end plate 24 is secured to the fuel elements 28 by joining means presently to be described in connection with end plate 24. Obviously, the fuel element bundle 20 can comprise, either exclusively or in other combinations thereof, subassemblies 22 or 23.

As better shown in FIGS. 3 and 4, the end plates 24 are provided with a plurality of openings 44 through each of which a fillister-headed screw 46 is inserted for engaging the tapped hole 38 of the plug members 34. The underside of the plate 24 is provided with recesses or counterbores 48 individually surrounding each of the holes 44, into which recesses the annular projections 40 of the end plugs 34 are fitted when the bolts 46 are tightened, thereby ensuring accurate positioning of the fuel elements 28 relative to the end plate 24. On the opposite side of the plate 24, the holes 44 are countersunk as indicated by the reference characters 50, in order that the fillister-headed screws may be recessed below the surface of the plate 24. Thus, another plate, for example, end plate 26, may overlie the surface of plate 24 for purposes subsequently to be explained, without being undesirably spaced therefrom by contacting the screws 46. Plate 24 is provided additionally with a number of flow apertures 52 (FIG. 3) disposed adjacent the openings 44 and thus arranged for the admission of water or other cooling and moderating fluid between the fuel elements 28.

In the subassemblies 22, the fuel elements 28 are each provided at one end thereof with individual plug members 36, described heretofore, the central studs 42 of which are threaded into suitably spaced apertures 54 provided in the end plates 26 (FIG. 5) and spaced in spatial conformity with the apertures 44 of plates 24. After threading the studs 42 into the apertures 54 as aforesaid, the opposite or free ends of the fuel elements 28 provided with the plug members 34 are then secured to the end plate 24 in the manner described heretofore in connection with FIG. 3. The end plates 26 are likewise provided with flow apertures suitably spaced among the apertures 54. It will be obvious from the aforedescribed manner of securing the fuel elements 28 that the latter will be maintained in a precise spatial arrangement thereof relative to the end plates 24 and 26. This results from the aforesaid engagement of the annular projection 40 with the recesses 48, and the engagement of the threaded stud 42 with the tapped apertures 54 where the end plates 26 are utilized, as in the subassemblies 22.

The subassemblies 22 or 23, or both, are secured together in tandem relationship by means of a number of tie rods 56, four being shown (FIG. 2) in this example of the invention. When the subassemblies 22 or 23 are thus assembled, it will be observed that the contiguous abutment of the end plates 26 with the end plates 24 of adjacent assemblies will prevent the loss of screws 46 into the coolant stream should the bolts become loosened. Such loss is extremely undesirable inasmuch as a loose part of this nature provides, through erosion thereof, means for the lodgement of radioactivity in the coolant stream. These small parts further can lodge within the reactor core in a manner to prevent proper cooling of one or more of the fuel elements 28 and to cause thereby hot spots necessitating shutting down the reactor.

To permit expansion endwise of the fuel elements 28, the tie rods 56 are furnished at each of the end subassemblies 22 and 23, with a sleeve 58 arranged to abut against an end plate 24 or 26 of each subassembly 22 or 23 and to protrude through the other end plate 24 or 26 of each subassembly, whereupon each of the sleeves 58 abuts against a screw retaining plate 60 juxtaposed relative to the outermost end plates 24. In the centrally disposed subassembly 22', the tie rod sleeves 58 abut, in this example, the end plate 26 of the subassembly 22' and pass through the other end plate 24 thereof to abut the end plate 26 of adjacent subassembly 22, which last-mentioned end plate 26 is spacedly removed from the aforesaid end plate 24, as indicated by reference character 63.

It will be apparent then that expansion of the fuel elements 28 in any or all of the subassemblies 22 and 23 cause the respective end plates 24 to move along the sleeves 58 without causing bearing stresses to be applied to the screw retaining plates 60. Obviously, spaces 62 between the screw retaining plates 60 and the outermost end plates 24, and the space 63 between end plates 24 and 26, will be selected such as to permit the anticipated amount of expansion in the fuel elements 28. During operation of the nuclear reactor, in which the fuel element bundle 20 is utilized, the fuel elements 28, being at a higher temperature than the tie rods 56, will expand to a greater extent, as is well known.

One arrangement for clamping the subassemblies 22 or 23 together on the tie rods 56 includes spacer members 64 inserted over each end of the tie rods 56, and respectively secured in place by spacing plates 66, and by the nuts 70 likewise assembled upon the tie rods 56. In order to precisionally position the spacing plates 66 and associated components relative to the subassemblies 22 or 23, the apertures 72 of the spacing plates 66 are countersunk at 74 (FIG. 1) to admit and position the outward ends of the spacer members 64. After the tie rod nuts 70 are tightened to produce the desired tension in the tie rods 56, the tubular projections 76 of the tie rod nuts 70 are welded or peened as indicated by reference character 78 to a flange member 80, which extends outwardly from each nozzle 68 and through suitable apertures in which the projections 76 are inserted.

The fuel element bundles 20 thus formed are adapted for suspension between two reactor core supporting members (not shown) provided with holes of appropriate size into which holes the tubular ends, that is to say the nozzles 68, of the fuel element bundle 20 are inserted, respectively. The nozzles 68 are each provided with a flow passage 81 for the admission and exit of cooling fluid relative to the reactor core, which fluid flows through suitable apertures in the screw retaining plates 60 and through apertures 52 (FIG. 2) of the end plates 24 and 26 in order to cool the fuel elements 28 suspended therebetween. The flange members 80 not only ensure the tightness of the tie rod nuts 70, which are secured as aforesaid to the flange members, but in addition prevents the loss thereof into the coolant stream in the event that one of the tie rod nuts should become detached due to breakage of the threaded ends of the tie rods 56.

Figure 7:
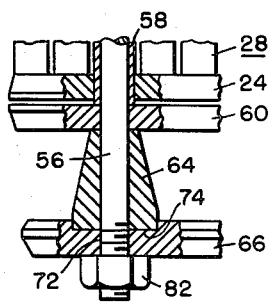
FIG. 7 is a partial view, partly in section, of an alternative tie rod connection made in accordance with this invention.

Alternatively, in less stringent applications of the fuel element bundle 20, the tie rod nut 70 and the flange member 80 can be replaced by a conventional nut 82 illustrated in FIG. 7. In the latter arrangement the nozzles 68 can be secured directly to the spacing plates 66, as by welding.

Figure 6:
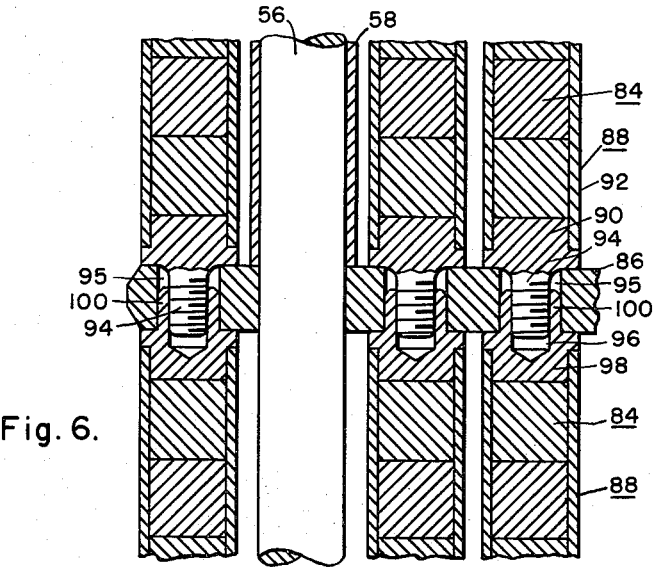
FIG. 6 is a partial sectional view of another connecting means constructed in accordance with this invention.

An alternative arrangement for securing rod-type fuel elements 84 to an end plate 86 is illustrated in FIG. 6. In this example of the invention, a single end plate 86 is utilized to separate the fuel element subassemblies 88. Fuel elements 84 are similar in structure to the aforedescribed elements 28 and, in this example, are provided with plug members 90 inserted into an end of a tubular casing 92. The plug members 90 are furnished with centrally threaded studs 94 adapted to be inserted through suitable apertures 95 of the end plate 86 and to be threaded into a centrally tapped hole 96 of plug members 98, which are inserted in the oppositely disposed ends of adjacent fuel elements 84. The fuel elements 84 are accurately positioned relative to the end plate 86 by means of the annular projections 100 of the plug members 98, which projections are fitted snugly within the end plate apertures 95.

When using the connecting means illustrated in FIG. 6 to connect the fuel element subassemblies 88 in tandem to form a fuel element bundle similar to that indicated by the reference character 20 in FIG. 1, it will be appreciated that the fuel elements 84 of a subassembly 88 adjacent the lower end of the fuel element bundle, as viewed in FIG. 6, can be threaded into tapped apertures of a single outermost end plate (not shown) at such end of the fuel element bundle while, in that subassembly 88 adjacent the opposite end of the bundle, the fuel elements 84 thereof can be connected to an outermost end plate 24 by means of the fillister-headed screws 46 and plug members 34 described heretofore and illustrated in FIGS. 1 and 4.

In this latter arrangement of the fuel element bundle, it is apparent that each of the dual end plates (except one pair of outermost plates, if it is desired to retain positively the screws 46) of the fuel element bundle 20 can be replaced by a single end plate 86 (FIG. 6).

In view of the foregoing description, it is evident that novel and efficient forms of a fuel element bundle have been disclosed, the component parts of which can be assembled with a minimum of skill but with the utmost precision. Many modifications of the exemplary constructions described herein will occur to those skilled in the art without departing from the scope of the appended claims. Moreover, it will be understood that certain features of the invention can be utilized without a corresponding use of other features.

We claim as our invention:

1. In a fuel element bundle adapted for use in a nuclear reactor core; the combination comprising a plurality of parallel end plates; a number of tie rods extending through said end plates; a plurality of encased fuel elements supported in spaced array between adjacent ones of said end plates, each of said fuel elements having a plug member inserted into and end thereof and provided with a centrally tapped hole, said plug members and said fuel elements being secured to one of said plates by headed screws inserted through spaced apertures in said end plate and threaded into said tapped holes; means for securing the other ends of said fuel elements to another of said end plates; screw retaining plates mounted on said tie rods adjacent the outer ones of said end plates; and means associated with said tie rods for clamping said screw retaining plates and said end plates together upon said tie rods.

2. In a fuel element bundle adapted for use in a nuclear reactor core, the combination comprising a plurality of parallel end plates; a number of tie rods extending through said end plates; a plurality of encased fuel elements supported in spaced array between adjacent ones of said end plates, each of said fuel elements having a plug member inserted into an end thereof and provided with a centrally tapped hole, said plug members and said fuel elements being secured to one of said end plates by headed screws inserted through spaced apertures in said end plate and threaded into said tapped holes; means for securing each of the other ends of said fuel elements to another of said spaced end plates, said means including a second plug member inserted into the opposite end of said fuel element and having a threaded stud secured centrally thereof and threaded into a tapped aperture of said opposite end plate; screw retaining plates mounted on said tie rods adjacent the outermost ones of said end plates; and means associated with said tie rods for clamping said screw retaining plates and end plates together upon said tie rods.

3. In a fuel element bundle adapted for use in a nuclear reactor core, the combination comprising a plurality of fuel element subassemblies each including spaced end plates, a plurality of fuel elements supported in spaced array between said end plates and securing means associated with an end of each fuel element for securing said fuel elements endwise to said end plates; said subassemblies being mounted in tandem relationship upon a number of tie rods each extending therethrough; a plurality of tie rod sleeves assembled on each said tie rods, each said tie rod sleeves individually abutting an end plate of each said subassemblies and passing through the other end plate of said subassemblies; a pair of securing means retaining plates assembled on said tie rods individually adjacent the ends thereof and spacedly removed from the outermost end plates of said subassemblies, said retaining plates abutting said outermost tie rod sleeves; and means associated with said tie rods for clamping said retaining plates, said tie rod sleeves, and said subassemblies together upon said tie rods.

4. In a fuel element bundle adapted for use in a nuclear reactor core, the combination comprising at least three spaced plates having a plurality of spaced apertures therein, a number of tie rods extending through said plates; at least two groups of spaced encased fuel elements supported in tandem between adjacent ones of said plates, one group of said fuel elements each having at an end thereof a first plug member inserted therein and including an annular projecting portion surrounding a tapped hole in said plug member, said projecting portions being inserted into said apertures of one of said plates, the adjacent ends of an adjacent one of said groups of fuel elements having second plug member inserted therein and each including a central threaded stud, said studs individually protruding through the apertures of said one plate and being threaded into said tapped holes of said first plug members, means for securing the other ends of each of said groups to adjacent plates, respectively; and means associated with said tie rods for clamping said plates together upon said tie rods.

5. In a fuel element bundle adapted for use in a nuclear reactor core, the combination comprising a plurality of fuel element subassemblies each including spaced end plates, a plurality of fuel elements supported in spaced array between said end plates and coupling means associated with an end of each fuel element for coupling said fuel elements to said end plates; said subassemblies being mounted in tandem relationship upon a number of tie rods each extending therethrough; a pair of coupling means retaining plates assembled on said tie rods individually adjacent the outermost end plates of said fuel element bundle; and means associated with said tie rods for clamping said retaining plates and said subassemblies together upon said tie rods.

6. In a fuel element bundle adapted for use in a nuclear reactor core; the combination comprising a plurality of fuel element subassemblies each including a pair of spaced plates, a plurality of fuel elements supported in spaced array between said plates and coupling means associated with an end of each fuel element for detachably coupling said fuel elements endwise to said plates; a pair of coupling means retaining plates; securing means for securing said subassemblies together in tandem relationship and for mounting said retaining plates adjacent the outermost ones of said plates; and means for movably mounting at least one of said plates of each said subassemblies relative to said securing means.

7. In a fuel element bundle adapted for use in a nuclear reactor core; the combination comprising a plurality of parallel end plates each having a plurality of apertures disposed therein in alignment with apertures of like end plates, said end plates each having a counterbored portion surrounding each of said apertures; a number of tie rods extending through said end plates; a plurality of encased fuel elements supported in spaced array between adjacent ones of said end plates, said fuel elements each having a plug member inserted into an end thereof and provided with a centrally tapped hole and with an annular projection surrounding said hole, said plug member and said fuel elements being aligned with one another and being secured to one of said end plates by the insertion of said annular projections, respectively, into said counterbored portions and by headed screws inserted through said apertures and threaded into said tapped holes; means for securing the other ends of said fuel elements to another of said end plates; screw retaining plates mounted on said tie rods adjacent the outermost ones of said end plates; and means associated with said tie rods for clamping said screw retaining plates and said end plates together upon said tie rods.

8. In a fuel element bundle adapted for use in a nuclear reactor core; the combination comprising a plurality of fuel element subassemblies mounted on a number of tie rods, each said subassemblies having flow passages extending therethrough and communicating with flow passages of adjacent subassemblies; a pair of spacer members mounted on each said tie rods near the ends thereof and in positions individually adjacent the outermost of said subassemblies; a pair of spacing plates each mounted on said tie rods near the ends thereof, respectively, said spacing plates having apertures therein through which said tie rods pass respectively and having a counterbored recess surrounding each said apertures; said spacer members having complementary portions inserted respectively into said counterbored recesses; a pair of flow nozzles; and means for securing said flow nozzles to respective ends of said tie rods to clamp the nozzles, spacer members, and subassemblies together on said tie rods.

9. A fuel element bundle adapted for use in a nuclear reactor core, said bundle comprising a plurality of spaced end plates each having a plurality of apertures disposed therein in alignment with apertures of like end plates, said end plates each having a counterbored portion surrounding each of said apertures; a number of tie rods extending through said end plates; a plurality of encased fuel elements supported in spaced array between adjacent ones of said end plates, said fuel elements each having a plug member inserted into an end thereof and provided with an annular projection having a centrally tapped hole therein, said plug members and said fuel elements being aligned with one another and being secured to one of said end plates by insertion of said annular projections, respectively, into said counterbored portions and by screw means cooperating with said apertures and threaded into said tapped holes; a pair of spacer members mounted on each said tie rods near the ends thereof and in positions individually adjacent the outermost ones of said end plates; a pair of flanged nozzles each mounted on said tie rods near the ends thereof, respectively, the flanged portions of said nozzles having apertures therein through which said tie rods pass and having a counterbored recess surrounding each said apertures; said spacer members having complementary portions inserted respectively into said counterbored recesses, whereby said nozzles are aligned relative to said end plates and said fuel elements; and means clamping the nozzles, spacer members, and end plates together upon said tie rods.

10. In a fuel element bundle adapted for use in a nuclear reactor core, the combination comprising at least one fuel element subassembly including spaced end plates, a plurality of fuel elements supported in spaced array between said end plates, and coupling means associated with an end of each fuel element for coupling said fuel elements to said end plates; a number of tie rods each extending through said subassembly; a pair of coupling means retaining plates asembled on said tie rods and disposed respectively adjacent the outermost end plates of said fuel element bundle; and means coupled to said tie rods for clamping said retaining plates and said subassembly together upon said tie rods.

11. In a fuel element bundle adapted for use in a nuclear reactor core, the combination comprising at least one fuel element subassembly including a pair of spaced end plates, a plurality of fuel elements supported in spaced array between said end plates, and securing means associated with each fuel element for securing said elements to said end plates; a number of tie rods each extending through said subassembly; a tie rod sleeve assembled on each said tie rod, each of said sleeves abutting an end plate of said assembly and passing through the other end plate thereof, said other end plate being free to move relative to said sleeves; and means secured to said tie rods for supporting said subassembly in said reactor core.

12. In a fuel element bundle adapted for use in a nuclear reactor core, the combination comprising at least one fuel element subassembly including a pair of spaced end plates, a plurality of fuel elements supported in spaced array between said end plates, and securing means associated with each fuel element for securing said elements endwise to said plates; a number of tie rods each extending through said subassembly; a tie rod sleeve assembled on each said tie rod, each said sleeve abutting an end plate of said assembly and passing through the other end plate thereof, said other end plate being free to move relative to said sleeves; a pair of securing means retaining plates assembled on said tie rods at positions adjacent said end plates respectively, that retaining plate adjacent said other end plate abutting said tie rod sleeves; and means associated with said tie rods for clamping said retaining plates, said tie rod sleeves, and said subassembly together upon said tie rods.

13. In a fuel element bundle adapted for use in a nuclear reactor core, the combination comprising a plurality of spaced plates having a plurality of spaced apertures therein, a plurality of groups of spaced encased fuel sections, each of said groups being supported in spaced array between an adjacent pair of said plates, the fuel sections of said groups being aligned respectively to provide substantially continuous fuel elements extending through said bundle and to provide flow passages between said elements, each of said elements including a section from each of said groups and means for joining said last-mentioned sections endwise in tandem relation, said fuel elements passing through the apertures respectively of said plates with the latter being disposed respectively adjacent the junctions of one group of sections with an adjacent group, a pair of mounting members for said bundle, and means for joining the free outer ends of said elements to said members respectively.

14. In a fuel element bundle adapted for use in a nuclear reactor core, the combination comprising a plurality of spaced plates having a plurality of spaced apertures therein, a plurality of groups of spaced encased fuel sections, each of said groups being supported in spaced array between an adjacent pair of said plates, the fuel sections of said groups being aligned respectively to provide substantially continuous fuel elements extending through said bundle and to provide flow passages between said elements, each of said elements including a section from each of said groups and means for joining said last-mentioned sections endwise in tandem relation, said joining means including a first plug member inserted at an end of one of the associated sections and having an annular projecting portion surrounding a tapped hole in said plug member, said projecting portions being inserted into corresponding apertures of said plates respectively, the adjacent end of the other associated one of said fuel sections having a second plug member inserted at its end and including a central threaded stud, said stud respectively protruding through said corresponding apertures and being threaded into said tapped holes of said first plug members, said fuel elements passing through the apertures respectively of said plates with the latter being disposed respectively adjacent the junctions of one group of sections with an adjacent group, a pair of mounting members for said bundle, and means for joining the free outer ends said elements to said members respectively.

15. In a fuel element bundle adapted for use in a nuclear reactor core, the combination comprising a plurality of spaced plates having a plurality of spaced apertures therein, a plurality of groups of spaced encased fuel sections, each of said groups being supported in spaced array between an adjacent pair of said plates, the fuel sections of said groups being aligned respectively to provide substantially continuous fuel elements extending through said bundle and to provide flow passages between said elements, each of said elements including a section from each of said groups and means for joining said last-mentioned section endwise in tandem relation, said fuel elements passing through the apertures respectively of said plates with the latter being disposed respectively adjacent the junctions of one group of sections with an adjacent group, a pair of mounting members for said bundle, and means for mounting the free ends of said elements on said mounting members respectively so that at least some of said free ends are movable relative to said mounting members.

16. In a fuel element bundle adapted for use in a nuclear reactor core, the combination comprising at least one fuel element subassembly including a pair of spaced generally parallel end plates, a plurality of elongated fuel elements supported in a substantially parallel spaced array between said plates, said end plates each having a number of apertures therein, and coupling means mounted in the apertures of each end plate and engaging the ends of each of said fuel elements respectively for coupling said fuel elements endwise to said plates, a pair of retaining plates for said coupling means, said retaining plates being substantially coextensive with said end plates respectively, means for securing said retaining plates to said bundle at positions closely adjacent said end plates respectively so that said retaining plates prevent disengagement of said coupling means from their associated end plates, and means for movably mounting at least one of said end plates relative to said securing means.

References Cited in the file of this patent

UNITED STATES PATENTS

| | | |
|---|---|---|
| 2,825,688 | Vernon | Mar. 4, 1958 |
| 2,825,689 | Szilard et al. | Mar. 4, 1958 |
| 2,832,733 | Szilard et al. | Apr. 29, 1958 |
| 2,851,410 | Vernon et al. | Sept. 9, 1958 |

OTHER REFERENCES

Lichtenberger et al.: "Proceedings of the International Conference on the Peaceful Uses of Atomic Energy," vol. 3, pp. 345–349 (Aug. 8–20, 1955).